(12) United States Patent
Ahmad et al.

(10) Patent No.: US 12,309,675 B2
(45) Date of Patent: May 20, 2025

(54) 5G PROSE SERVICE BASED DISCOVERY

(71) Applicant: INTERDIGITAL PATENT HOLDINGS, INC., Wilmington, DE (US)

(72) Inventors: Saad Ahmad, Montreal (CA); Samir Ferdi, Kirkland (CA); Michelle Perras, Montreal (CA); Xiaoyan Shi, Westmount (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 310 days.

(21) Appl. No.: 17/775,095

(22) PCT Filed: Nov. 6, 2020

(86) PCT No.: PCT/US2020/059543
§ 371 (c)(1),
(2) Date: May 6, 2022

(87) PCT Pub. No.: WO2021/092492
PCT Pub. Date: May 14, 2021

(65) Prior Publication Data
US 2022/0400362 A1 Dec. 15, 2022

Related U.S. Application Data

(60) Provisional application No. 62/932,320, filed on Nov. 7, 2019.

(51) Int. Cl.
*H04W 4/50* (2018.01)
*H04W 12/084* (2021.01)
*H04W 76/14* (2018.01)

(52) U.S. Cl.
CPC .......... *H04W 4/50* (2018.02); *H04W 12/084* (2021.01); *H04W 76/14* (2018.02)

(58) Field of Classification Search
CPC ......... H04W 4/20; H04W 4/50; H04W 8/005; H04W 12/08; H04W 12/084; H04W 12/106; H04W 76/14
(Continued)

(56) References Cited

U.S. PATENT DOCUMENTS 10,511,954 B2 * 12/2019 Sen ........................ H04W 76/14
10,924,912 B2   2/2021 Kim et al.
(Continued)

OTHER PUBLICATIONS

IEEE Standard for Information technology—Telecommunications and information exchange between systems Local and metropolitan area networks—Specific requirements; Part 11: Wireless LAN Medium Access Control (MAC) and Physical Layer (PHY) Specifications, IEEE Std. 802.11-2016 (Dec. 7, 2016).
(Continued)

*Primary Examiner* — Jean A Gelin
(74) *Attorney, Agent, or Firm* — Volpe Koenig

(57) ABSTRACT

Methods and apparatuses are described herein for proximity-based services (ProSe) service-based discovery. For example, a service utilizing-wireless transmit/receive unit (SU-WTRU) may be provisioned with a type of discovery on a per-service basis and a security credential on a per-service basis. The SU-WTRU may transmit (315) a PC5 discovery message with the type of discovery and a first security element that is generated based on the security credential. The WTRU may then receive (325), from a service providing-wireless transmit/receive unit (SP-WTRU), a PC5 discovery response message that includes a second security element and a service identity associated with a service that the SP-WTRU provides. On a condition that the second security element is verified based on the provisioned security credential, the SU-WTRU may authorize (330) the SP-WTRU to establish a PC5 communication link with the SP-WTRU.

14 Claims, 8 Drawing Sheets

(58) Field of Classification Search
USPC .......................................................... 455/411
See application file for complete search history.

(56) References Cited

U.S. PATENT DOCUMENTS

| | | | | |
|---|---|---|---|---|
| 11,803,766 | B1* | 10/2023 | Srinivasan | G06N 5/04 |
| 2016/0205531 | A1* | 7/2016 | Chen | H04W 8/005 |
| | | | | 455/41.2 |
| 2016/0205532 | A1* | 7/2016 | Chen | H04W 48/16 |
| | | | | 370/328 |
| 2016/0295347 | A1 | 10/2016 | Ahmad et al. | |
| 2017/0337394 | A1* | 11/2017 | Wang | H04L 67/51 |
| 2018/0027479 | A1 | 1/2018 | Ahmad et al. | |
| 2018/0115895 | A1* | 4/2018 | Lehtovirta | H04W 8/005 |
| 2018/0279110 | A1* | 9/2018 | Sen | H04W 8/005 |
| 2019/0109714 | A1* | 4/2019 | Clark | H04L 67/565 |
| 2019/0394631 | A1* | 12/2019 | Stojanovski | H04W 8/005 |
| 2022/0337989 | A1* | 10/2022 | Ferdi | H04W 12/106 |
| 2023/0217232 | A1* | 7/2023 | Cheng | H04L 67/61 |
| | | | | 370/328 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Interdigital Inc., "KI #1, Sol #1 Update: Clarification on metadata," SA WG2 Meeting #139e, S2-2003821, Elbonia (Jun. 8-12, 2020).

Interdigital Inc., "Solution for ProSe direct discovery," SA WG2 Meeting #136, S2-1911800, Reno, NV, USA (Nov. 18-22, 2019).

Interdigital, "Update to Solution # 1 (Restricted Direct Discovery)," SA WG2 Meeting #136AH, S2-2001499, Incheon, South Korea (Jan. 13-17, 2020).

Oppo et al., "Solution for direct discovery," SA WG2 Meeting #136, S2-1912707, Reno, NV, USA (Nov. 18-22, 2019).

Third Generation Partnership Project, "Technical Specification Group Services and System Aspects; Proximity-based services (ProSe); Stage 2 (Release 15)," 3GPP TS 23.303 V15.1.0 (Jun. 2018).

Third Generation Partnership Project, "Technical Specification Group Services and System Aspects; Proximity-based services (ProSe); Stage 2 (Release 16)," 3GPP TS 23.303 V16.0.0 (Jul. 2020).

Third Generation Partnership Project, "Technical Specification Group Services and System Aspects; Proximity-based Services (ProSe); Security aspects (Release 16)," 3GPP TS 33.303 V16.0.0 (Jul. 2020).

Third Generation Partnership Project, "Technical Specification Group Services and System Aspects; Proximity-based Services (ProSe); Security aspects (Release 15)," 3GPP TS 33.303 V15.0.0 (Jun. 2018).

Third Generation Partnership Project, "Technical Specification Group Services and System Aspects; Study on security issues to support Proximity Services (ProSe) (Release 14)," 3GPP TR 33.833 V2.0.0 (Dec. 2016).

Third Generation Partnership Project, "Technical Specification Group Services and System Aspects; Study on security issues to support Proximity Services (ProSe) (Release 13)," 3GPP TR 33.833 V13.0.0 (Jan. 2017).

Third Generation Partnership Project, "Technical Specification Group Core Network and Terminals; Proximity-services (ProSe) User Equipment (UE) to ProSe function protocol aspects; Stage 3 (Release 15)," 3GPP TS 24.334 V15.2.0 (Sep. 2018).

Third Generation Partnership Project, "Technical Specification Group Core Network and Terminals; Proximity-services (ProSe) User Equipment (UE) to ProSe function protocol aspects; Stage 3 (Release 15)," 3GPP TS 24.334 V16.0.0 (Jul. 2020).

Third Generation Partnership Project, "Technical Specification Group Services and System Aspects; Study on system enhancement for Proximity based Services (ProSe) in the 5G System (5GS) (Release 17)," 3GPP TR 23.752 V0.1.0 (Oct. 2019).

Third Generation Partnership Project, "Technical Specification Group Services and System Aspects; Study on system enhancement for Proximity based Services (ProSe) in the 5G System (5GS) (Release 17)," 3GPP TR 23.752 V0.6.0 (Nov. 2020).

* cited by examiner

5G PROSE SERVICE BASED DISCOVERY

CROSS REFERENCE TO RELATED APPLICATION

This application is the U.S. National Stage, under 35 U.S.C. § 371, of International Application No. PCT/US2020/059543 filed Nov. 6, 2020, which claims the benefit of U.S. Provisional Application No. 62/932,320, filed Nov. 7, 2019, the contents of which are incorporated herein by reference.

BACKGROUND

Proximity-based Services (ProSe) is a Device-to-Device (D2D) technology that allows wireless devices to detect each other and to communicate directly. In Long Term Evolution (LTE), the ProSe discovery is assisted by a ProSe function in the core network. For example, discovery codes are allocated to peer wireless transmit/receive units (WTRUs) and are translated into the service or service name/ID by the ProSe function. Such functionality may not exist in the 5G System (5GS) and WTRUs need to discover services that the WTRUs are interested in without the ProSe function in 5GS. Thus, ProSe direct discovery without interacting with a ProSe function in the core network while ensuring the privacy of the service are needed.

SUMMARY

Methods and apparatuses are described herein for Proximity-based Services (ProSe) service based discovery. For example, a service utilizing-wireless transmit/receive unit (SU-WTRU) may be provisioned with a type of discovery on a per-service basis and a security credential on a per-service basis. The SU-WTRU may transmit a PC5 discovery message with the type of discovery and a first security element that is generated based on the security credential. The SU-WTRU may receive, from a service providing-wireless transmit/receive unit (SP-WTRU), a PC5 discovery response message that includes a second security element and a service identity associated with a service that the SP-WTRU provides. If the second security element is verified based on the provisioned security credential, the SU-WTRU may authorize the SP-WTUR to establish a PC5 communication link with the SP-WTRU for direct communication.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
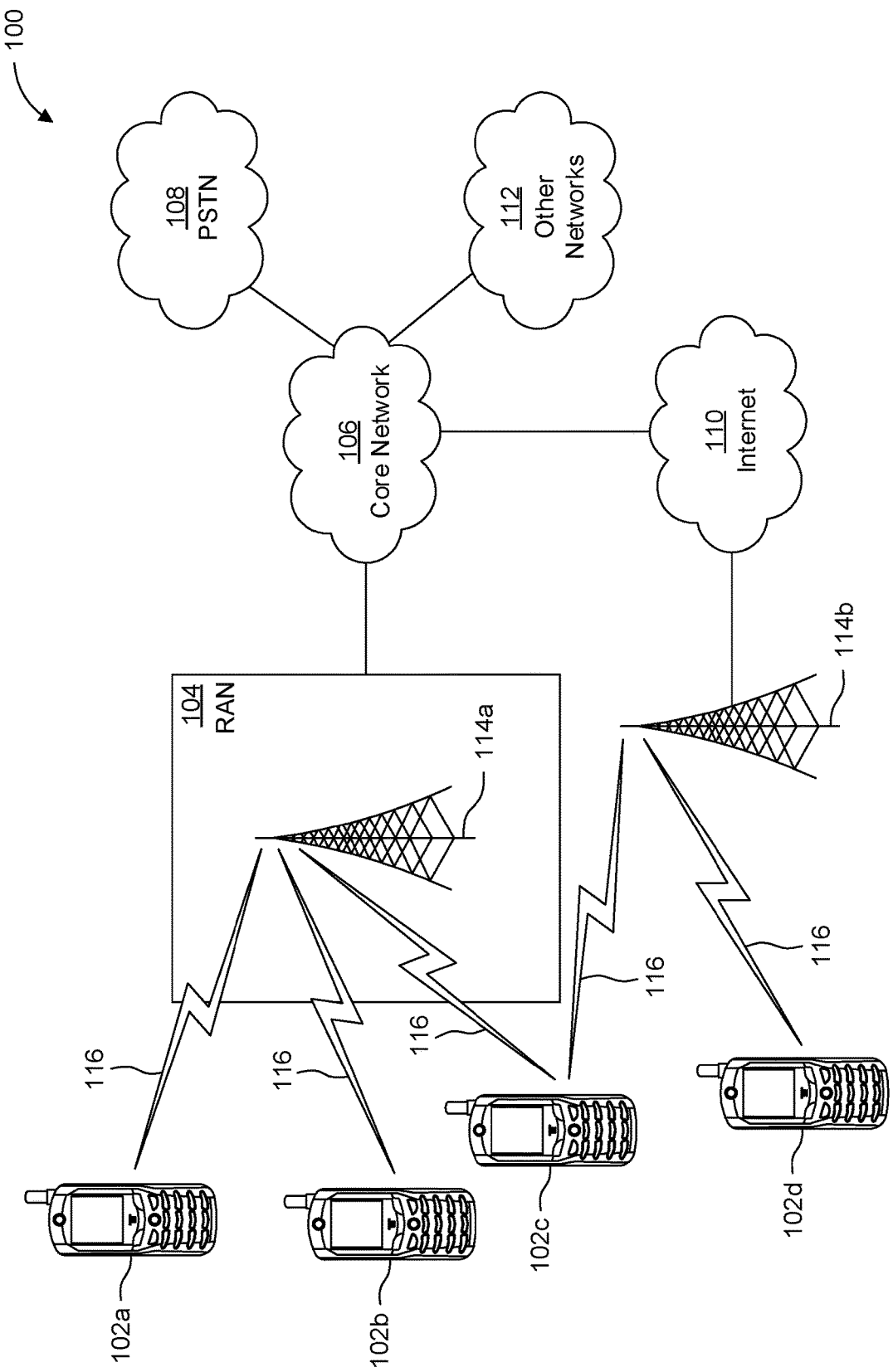
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
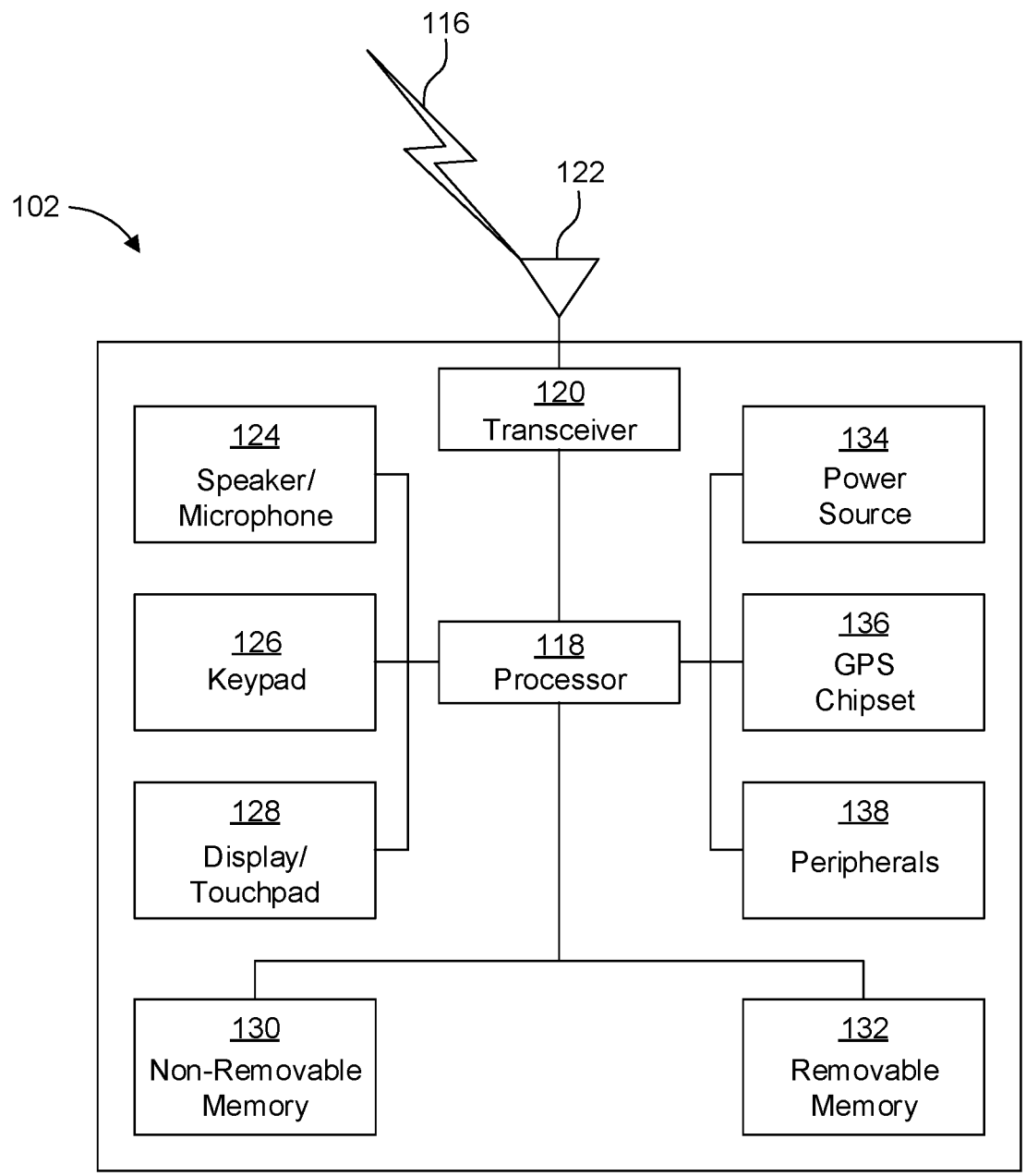
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
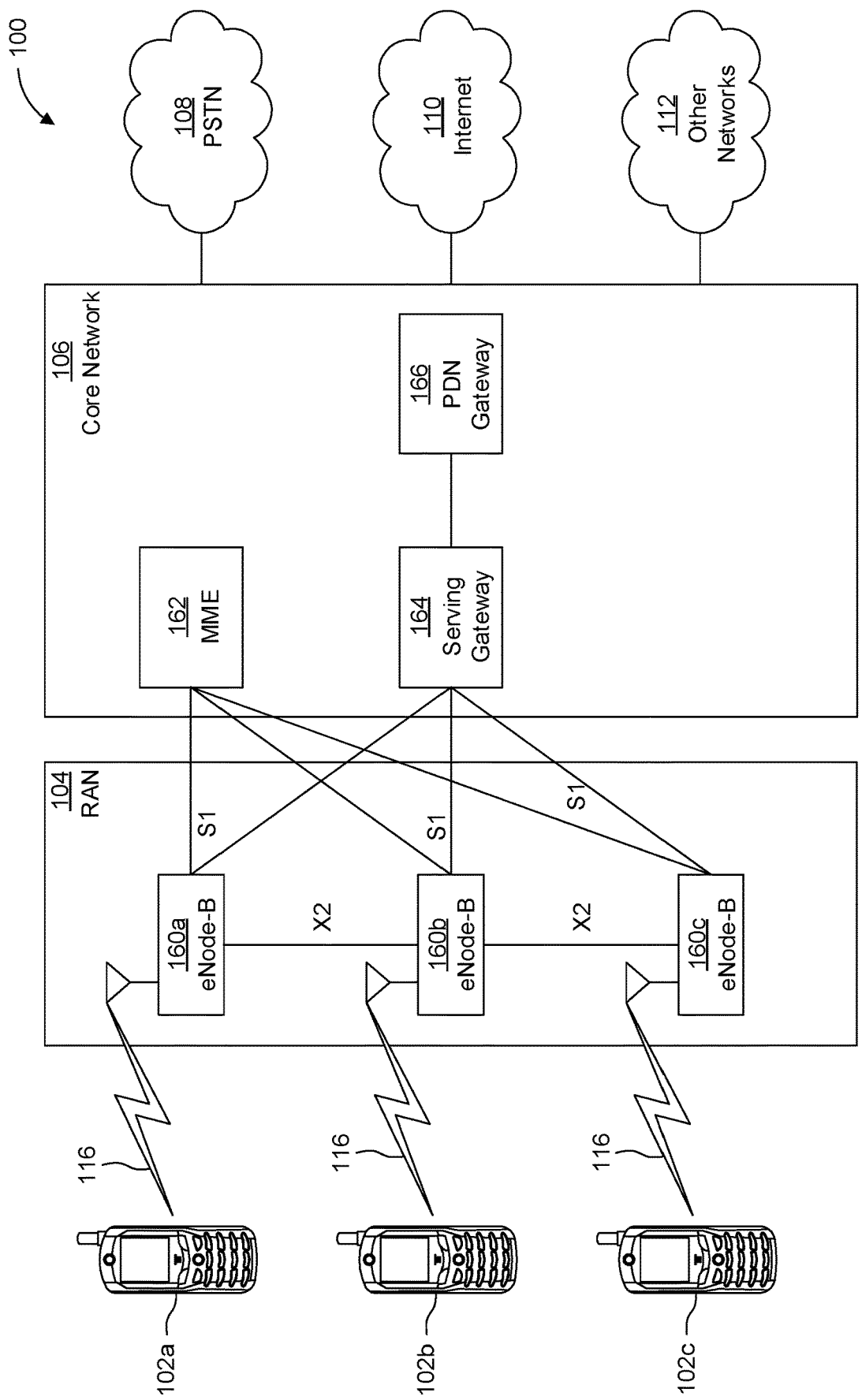
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
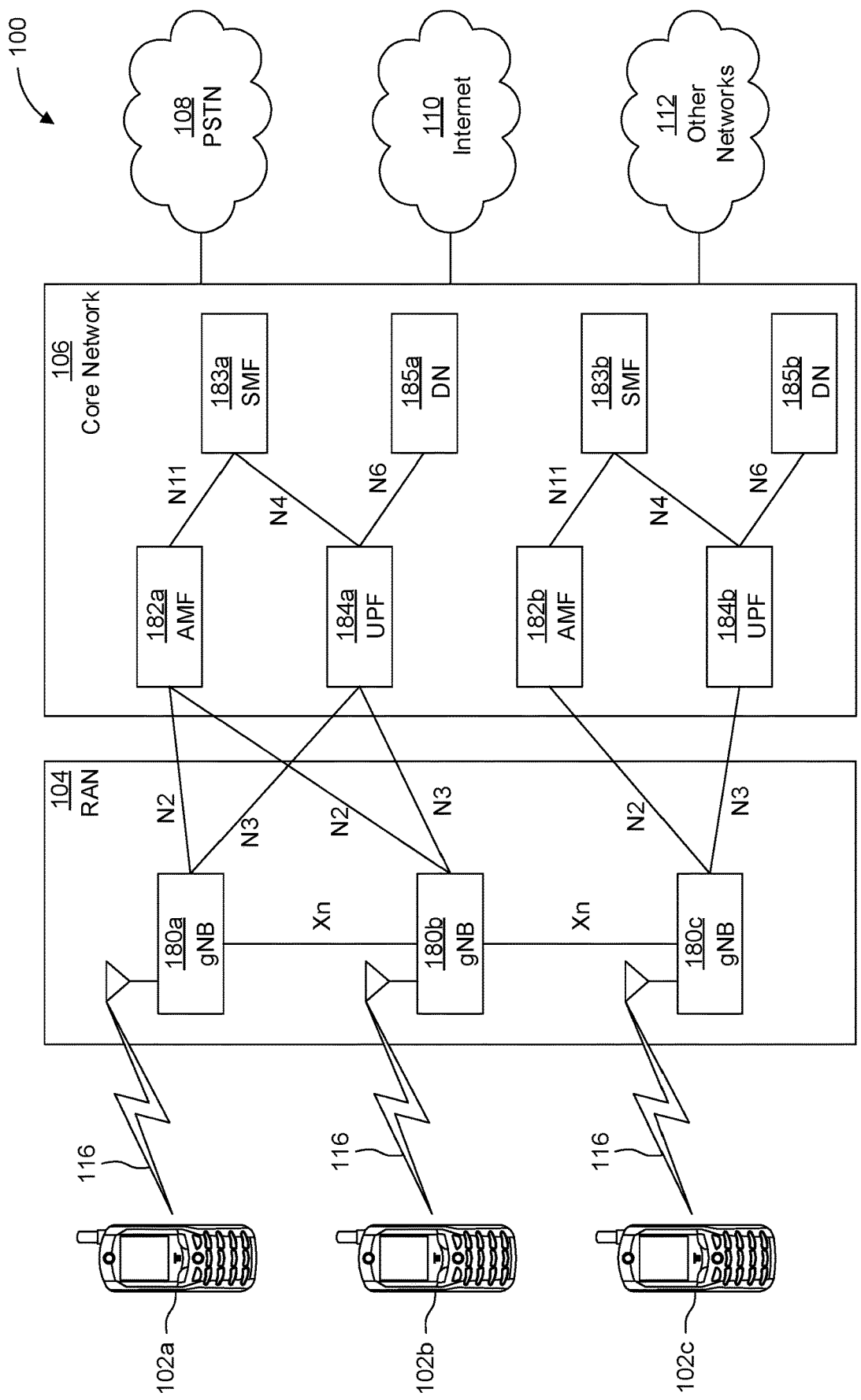
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In one or more embodiments, Proximity-based Services (ProSe) Direct Discovery may have two models: Model A (e.g., "I am here") and Model B ("who is there?"/"are you there?").

Model A may have two roles for ProSe-enabled WTRUs that are participating in ProSe Direct Discovery: (1) announcing WTRU, where the WTRU announces certain information that could be used by WTRUs in proximity that have permission to discover; and (2) monitoring WTRU, where the WTRU monitors certain information of interest in proximity to an announcing WTRU. In Model A, the announcing WTRU may broadcast one or more discovery messages at pre-defined discovery intervals. The monitoring WTRU that are interested in these broadcasted messages may read and process them. It is noted that Model A may be described as "I am here" since the announcing WTRU may broadcast information about itself (e.g., ProSe Application Identities, ProSe WTRU Identities in the discovery message, etc.).

Model B may have two roles for ProSe-enabled WTRUs that are participating in ProSe Direct Discovery: (1) discoverer WTRU, where the WTRU transmits a request containing certain information about what it is interested to discover; and (2) discoveree WTRU, where the WTRU that receives a request message may respond with some information related to the discoverer's request.

Figure 2:
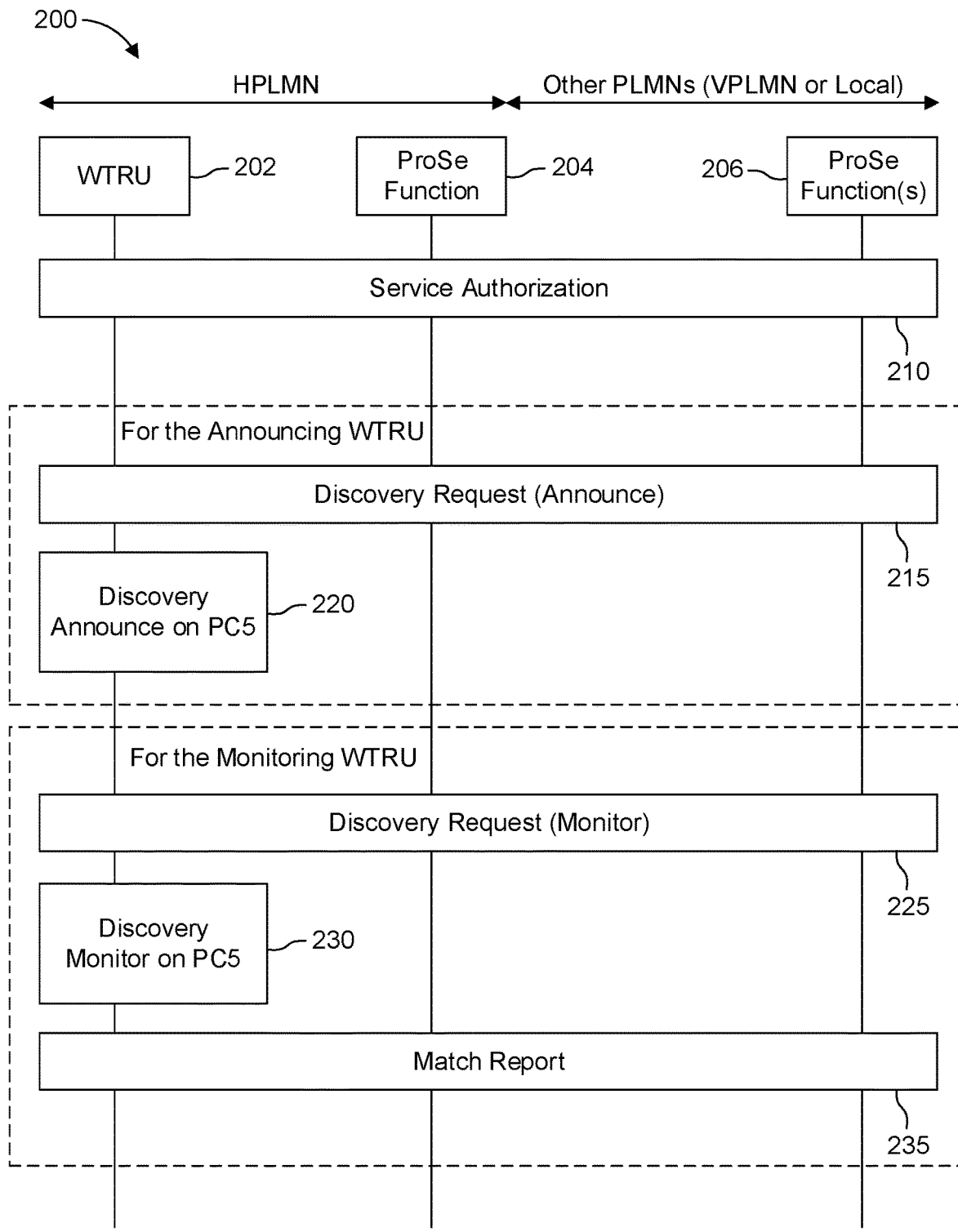
FIG. 2 is a diagram illustrating an example direct discovery procedure.

FIG. 2 illustrates an example direct discovery procedure 200, which may be used in combination with any of other embodiments described herein. In this example, the overall procedure for Open Direct Discovery (e.g., Model A) may be shown. During a service authorization at step 210, a WTRU 202 (e.g., UE) may obtain from the ProSe Functions 204, 206, via Open Mobile Alliance (OMA) Device Management (DM) procedures, authorization to announce or monitor in a particular PLMN (e.g., HPLMN or Other PLMNs). If the WTRU 202 is authorized to announce, it may send a Discovery Announce Request, at step 215, via a PC3 reference point to the ProSe Function 204. The Discovery Announce Request may include the service that the WTRU wants to advertise, for example, through a ProSe Application ID. Upon authorization, the ProSe Function 204 may provide a ProSe Application Code for the WTRU 202 to announce. Once the ProSe Application Code is provided to the WTRU 202, the WTRU 202 may start announcing on PC5 interface at step 220. If the WTRU is authorized to monitor in a particular PLMN, then the WTRU 202 may send a Discovery Monitor Request, at step 225, via PC3 reference point to the ProSe Function 204 including the service that the WTRU 202 wants to discover/monitor (e.g., through a ProSe Application ID) in the request. Upon authorization, the ProSe Function may provide to the WTRU a ProSe Application Code to monitor. Once the ProSe Application Code is provided to the WTRU 202, the WTRU 202 may start monitoring for the ProSe Application code on the PC5 interface at step 230. When the WTRU 202 detects that one or more ProSe Application Code(s) that match the filter, the WTRU 202 may report the ProSe Application Code(s) to the ProSe Function 204 at step 235.

The ProSe Function 204 may be a physical entity or a logical function that is used for network related actions required for ProSe. The PC5 interface is the reference point between ProSe-enabled WTRUs used for control and user plane for ProSe Direct Discovery, ProSe Direct Communication and ProSe WTRU-to-Network Relay.

In some cases, a ProSe or D2D device may need to discover each other to utilize the ProSe services or establish a direct communication connection between the peer WTRUs. The discovery procedure, as described above, may be based on transmitting ProSe discovery codes that the WTRU in coverage may receive by communicating with the entity in the core network (e.g., ProSe Function) that supports the discovery functionality. The ProSe discovery codes may be sent to the WTRU during the discovery procedure with the network per ProSe service type. The service type may refer to a particular ProSe application or a ProSe group. An application may be represented by an application ID where group may be referred by group ID. The WTRU trying to discover a ProSe WTRU may also have to communicate with the network to receive filtering information to be able to receive or understand the ProSe code broadcasted over the PC5 channel.

For the WTRUs that are out of coverage and/or public safety WTRU's, the ProSe code and filtering information may be pre-provisioned in the WTRU (e.g., in the Mobile Equipment and/or Universal Integrated Circuit Card) on a per service basis.

For 5GS architecture, a dedicated discovery function (e.g., ProSe Function) in the core network may not be an option. In this case, the 5G WTRU may need to be able to perform the PC5 discovery (e.g., Discovery procedure between the WTRU and ProSe Function) without interacting with the core network. Accordingly, there is a need for procedures and methods that enable ProSe discovery without a dedicated discovery function in the core network. For example, a WTRU may need to perform ProSe direct discovery for a service without interacting with a Core Network Discovery Function. In another example, there may be an issue related to the privacy of the WTRUs exchanging messages during the discovery process. The usage of Core Network Discovery Function as described above may enable the WTRU to receive discovery codes as well as establish discovery security context to protect such codes for integrity, confidentiality and replay protection during transmission. Accordingly, the WTRU needs to ensure the privacy of the service(s) or target WTRU identities transmitted during the discovery procedure.

The service(s) may refer to an application(s) or service(s) that the Service Utilizing (SU)-WTRU is looking for from the Service Providing (SP)-WTRUs. Both the SU-WTRU and SP-WTRU may be ProSe enabled WTRUs. In an example, the service may be a taxi application or service that a taxi company (i.e. SP-WTRU) provides to the SU-WTRUs in proximity to the SP-WTRU. In another example, the service may be a restaurant application or service that broadcasts the location/availability and menu of the restaurant (i.e. SP-WTRU) to the SU-WTRU in proximity to the SP-WTRU. The terms service and application may be interchangeably used throughout this disclosure.

In one or more embodiments, a Service Provider-WTRU (SP-WTRU) and Service Utilizing-WTRU (SU-WTRU) may be provisioned with the type of discovery (e.g., Model A or Model B) on a per-service basis. As described above, examples of services may include, but are not limited to, taxi service, restaurants, social apps, local markets, public transportation, and infotainment. Each service may be associated with a type of discovery (e.g., either Model A or Model B). For example, an SP-WTRU providing a taxi service and/or an SU-WTRU seeking for a taxi service may be provisioned with Model B discovery type. In another example, an SP-WTRU providing a restaurant service and/or an SU-WTRU seeking for a restaurant service may be provisioned with Model A discovery type. In addition, the provisioned information may include security credentials for the service (e.g., certificates, group key). The WTRUs may receive the provisioning information from an appropriate entity in the core network (e.g., PCF or ProSe Function). The provisioning information may also be received by the WTRUs from the ProSe Application Server. In the latter case, each ProSe application server may provision the WTRUs with the discovery type and security credentials for the service provided by the Application Server. Alternatively or additionally, the provisioning information may be preconfigured/prestored/preinstalled in the WTRU, for example, in a SIM card. The provisioning information may include an indication of whether privacy protection is expected to be enabled for a given service during discovery.

When the SU-WTRU is triggered (e.g., from the application layer) to discover a service, the SU-WTRU may check the discovery type associated with the service. If the service type is using Model B (a.k.a. solicitation), the SU-WTRU may generate a broadcast solicitation message (i.e. discovery request message) and use the provisioned security credentials to generate an integrity/replay protection element (e.g., signature, message authentication code (MAC)) called "security element" herein. If privacy protection is enabled based on provisioned profile, the SU-WTRU may use (e.g., provisioned) security credentials to confidentiality protect privacy sensitive unique identifiers (e.g., Service ID, target WTRU application ID below). For example, these identifiers may be encrypted using a group key and a time based counter for freshness. Alternatively or additionally, these identifiers may be randomized (e.g., salted) by means of a hash function using a random value (e.g., assuming a large enough space for identifiers and for the transmitted random value). The terms broadcast message, solicitation message, broadcast solicitation message, discovery message, discovery request message, PC5 discovery messages, request message or any combination thereof may be interchangeably used throughout this disclosure.

The SU-WTRU may then send the broadcast message on a PC5 discovery channel. The PC5 discovery message may include the type of discovery, which in this scenario may be set to "solicitation". The broadcast message may include, but are not limited to, one or more of the following: a Service ID (e.g., Application ID or group ID), SU-WTRU application layer WTRU ID, SU-WTRU ID (e.g., ProSe WTRU ID or L2 ID), a target WTRU application layer WTRU ID, the computed security element, and/or, an additional random value used for confidentiality protection of privacy-sensitive identifiers (e.g., if needed).

On the SP-WTRU side when the SP-WTRU receives the PC5 discovery solicitation message, it may check the security element in the received message. If the SP-WTRU is able to successfully verify the security element to check integrity and freshness of the received message, it may then generate the PC5 discovery response message. In addition, the SP-WTRU may decrypt (e.g., using a group key) the whole or part of the message (e.g., sensitive IDs) if privacy protection is enabled for the service according to the provisioned profile. Alternatively or additionally, the SP-WTRU may compute a hash of its application layer WTRU ID (e.g., Service ID), using a random value received in the solicitation message and attempt to compare the result with hashed application layer WTRU ID (e.g., Service ID) received in the solicitation message. The discovery response message may then be sent over the PC5 discovery channel. The PC5 response message may include the service ID, SP-WTRU application layer user ID, the generated security element, and/or the SP-WTRU ID (e.g., ProSe WTRU ID or L2 ID). The terms discovery response message, solicitation response message, response message, PC5 discovery response message, or any combination thereof may be interchangeably used throughout this disclosure.

The SU-WTRU may receive discovery/solicitation responses from one or more SP-WTRUs. The PC5 discovery response may include the security element generated by the SP-WTRU. The SU-WTRU may have to verify the received security element using the provisioned information as described above (e.g., signed/root certificate or group key) to identify/authorize the PC5 discovery response sent by the SP-WTRU. The privacy sensitive IDs may also be protected for confidentiality, as described above, if privacy protection is enabled for the service.

Once the SU-WTRU is able to verify the received security element in the PC5 response message, the discovery process may be completed.

After the SU-WTRU has discovered the SP-WTRU, the SU-WTRU may initiate the direct connection establishment procedure using PC5 signaling message. For example, the SU-WTRU may receive the SP-WTRU's L2 ID in the PC5 discovery response message to initiate the direct link establishment procedure. In some scenarios or for some services, the SU-WTRU may only request discovery metadata (e.g., restaurant menu, taxi fares, etc.) related to the service over the PC5 discovery channel. This procedure is further described herein.

Figure 3:
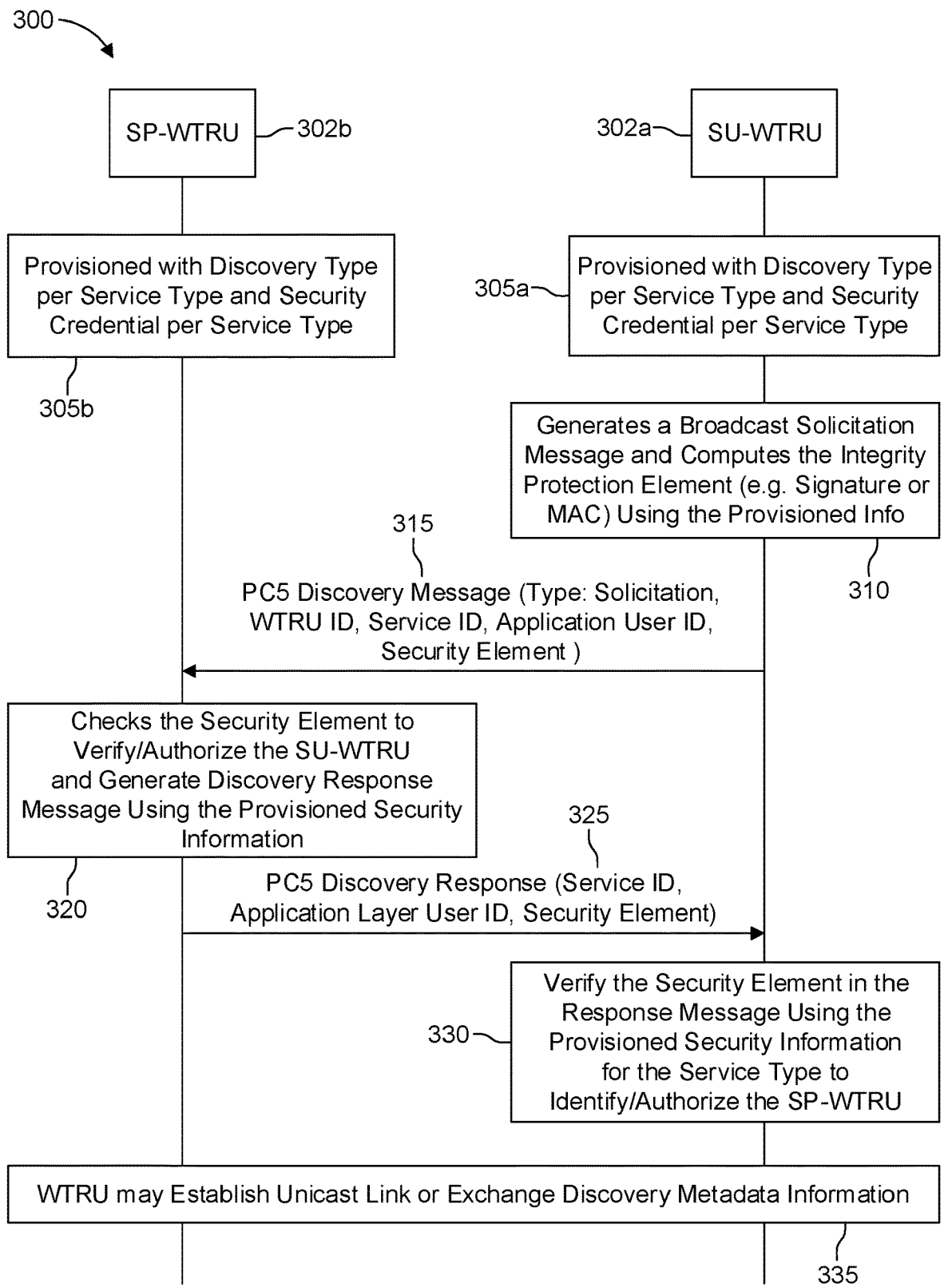
FIG. 3 is a diagram illustrating an example service oriented discovery procedure.

FIG. 3 illustrates an example service oriented discovery procedure 300 for solicitation (Model B), which may be used in combination with any of other embodiments described herein. In this example, at steps 305a, 305b, both SP-WTRU 302b and SU-WTRU 302a may be provisioned with a discovery type (e.g., Model A or Model B) per service type (or per service) and security credential (e.g., certificate, group key) per service type (or per service).

At step 310, the SU-WTRU 302a may generate a broadcast solicitation message (e.g., described in step 315) and compute the integrity protection element/security element (e.g., or MAC) using the provisioned information in step 305a. An example of the broadcast solicitation message may be a PC5 discovery message. The integrity protection element/security element may also be computed based on the contents of the broadcast solicitation message.

At step 315, assuming that the type of discovery provisioned in the SU-WTRU 302a is Model B, the SU-WTRU 302a may send the PC5 discovery message which may include the type of discovery, such as: "solicitation", WTRU ID (e.g., ProSe WTRU ID, source L2 ID), Service ID (e.g., application ID, application layer user ID, target application layer user ID, group ID, group member ID), and the security element computed in step 310.

At step 320, the SP-WTRU 302B monitoring the PC5 discovery channel may receive a broadcast solicitation message (i.e. PC5 discovery message) from the SU-WTRU at step 315. The SP-WTRU 302b may check the security element in the PC5 discovery message against the provisioned security credential to verify the SU-WTRU 302a identities and to subsequently generate a discovery response message(s) using the provisioned security information. The SP-WTRU 302b may compute a security element based on the provisioned security element at step 305b and include the generated security element in the response message at step 325.

At step 325, assuming that the type of discovery provisioned in the SP-WTRU 302b is Model B, the SP-WTRU 302b may send the PC5 discovery response message, which may include type of discovery message, such as: solicitation response, WTRU ID (e.g. ProSe WTRU ID, source L2 ID), Service ID (e.g., application ID, application layer user ID, target application layer user id, group ID or group member ID) and the security element computed at step 320.

At step 330, the SU-WTRU 302a may receive the discovery response message and verifies the security element in the discovery response message using the provisioned security information (e.g., security credentials provisioned at step 305a) for the service type to identify/authorize the SP-WTRU 302b. The successful verification of the security element in the response message may indicate to the SU-WTRU 302a that the SP-WTRU 302b has been discovered for a service.

At step 335, once the discovery is completed, the SU-WTRU 302a may decide to establish the PC5 communication link (e.g., Direct Unicast link) with the SP-WTRU 302b using the information received in the discovery response message at step 330. Another possibility may be for the SU-WTRU to request either one time or periodic metadata information that is related to the service from the SP-WTRU as described herein.

The example described in FIG. 3 applies to Model B discovery (e.g., the solicitation type discovery procedure). This example method may also be extended to Model A discovery (e.g., Model A with restricted discovery, i.e. reserved for WTRUs with appropriate permission from the application server). If, based on the provisioning information at step 305a of FIG. 3, the discovery type for a service is 'Model A', then the SU-WTRU 302a may try to detect one or more PC5 discovery message transmitted from one or more SP-WTRUs (including SP-WTRU 302b) over the discovery channel. The SU-WTRU 302a may then use the provisioned security information (e.g., security credential provisioned with the SU-WTRU 302a) to verify the broadcasted PC5 discovery messages sent from the SP-WTRUs and authorize the SP-WTRUs. The assumption for Model A based discovery may be that the SP-WTRU 302b is broadcasting a discovery message similar to the one that is described at step 325 of FIG. 3 without being solicited. When the SU-WTRU 302a detects the discovery message from the SP-WTRU 302b, it may verify the security element in the discovery message to verify integrity and authenticity of the identities (e.g., service ID, SP-WTRU ID) received in the message. Upon successful verification of the security element in the PC5 announcing message by the SU-WTRU 302a, the SU-WTRU 302a may determine that the discovery process has been completed. The SU-WTRU 302a may then proceed with step 335 of FIG. 3 as described above.

The discovery procedure described herein may also be used for WTRU-to-network relay and WTRU-to-WTRU relay discovery procedure. In these scenarios, one of the WTRUs (e.g., SP-WTRU 302b) may be a relay WTRU and a peer WTRU (e.g. SU-WTRU 302a) may be a remote WTRU. The PC5 discovery message may include an indication regarding the relay discovery, such as WTRU to network relay discovery or WTRU to WTRU relay discovery. Such indication may be explicit IE or may be reflected in the service ID or application layer user ID element broadcasted in the discovery message. The relay discovery may use both Model A or Model B discovery procedure.

In another embodiment, in order to support privacy protection, the SU-WTRU 302a may trigger an anonymous PC5 Discovery message, such as without SU-WTRU ID and without SU-WTRU L2 address. For example, a SU-WTRU 302a may set source address to a broadcast or groupcast L2 address; after receiving an anonymous PC5 Discovery message, if the SP-WTRU 302b accepted the request, the SP-WTRU 302b may broadcast a PC5 discovery response, which may include the Service ID.

In this embodiment, the procedure may be similar to the example shown in FIG. 3, except for the following: at steps 305a, 305b SU-WTRU/SP-WTRU may also be configured to allow anonymous discoverer/discoveree; at step 310, if the SU-WTRU 302a decides to use anonymous discovery, the SU-WTRU 302a may generate a broadcast solicitation message and set the source L2 address to anonymous L2 address (e.g. broadcast/groupcast address); at step 315, the SU-WTRU may include Service ID, but without WTRU ID, and in this message, the SU-WTRU may include Service ID or a Hashed service ID with a random parameter as specified above; at step 320, if the SP-WTRU 302b does not accept anonymous discovery, the SP-WTRU 302b may ignore the request; in step 325, the SP-WTRU 302b may broadcast/groupcast the PC5 discovery response message. In this message, the SP-WTRU 302b may include Service ID or a Hashed service ID with a random parameter as specified above.

In one embodiment, a discovery process may include a metadata request. As described herein, an SU-WTRU discovering an SP-WTRU may want to obtain metadata from the SP-WTRU without having to establish a unicast communication.

The SU-WTRU that wants to obtain metadata from an SP-WTRU (or multiple SP-WTRUs) may specify a "metadata" indication on the Discovery Request. An SP-WTRU receiving the Discovery Request and that also supports the specified Service ID may reply by sending a Discovery Response message including its application user ID, L2 ID, and the requested metadata. The security procedures described herein may be used to encrypt the metadata in the response message. The SP-WTRU may also send metadata in different PC5 messages depending on the length of the data. In this case the indication that is carried in the PC5 message may be that there is more metadata in the following discovery messages. The SP-WTRU may also inform the SU-WTRU that the metadata is dynamic, in which case the SU-WTRU may send a message back to the SP-WTRU to inform it that it should be notified whenever the metadata is updated. Alternatively or additionally, the SU-WTRU may keep monitoring the PC5 discovery channel to receive the updated metadata. In case of the dynamic metadata, an index or version may also be broadcasted by the SP-WTRU to inform the monitoring WTRU which current version is being broadcasted. If the SU-WTRU's index or version does not match the broadcasted version, the SU-WTRU may request the latest version of the metadata.

In one embodiment, the SU-WTRU may already know the SP-WTRU's application user ID (e.g., from provisioning information or earlier discovery). In this case, the SU-WTRU may include the SP-WTRU application user ID in the Discovery Request.

Figure 4:
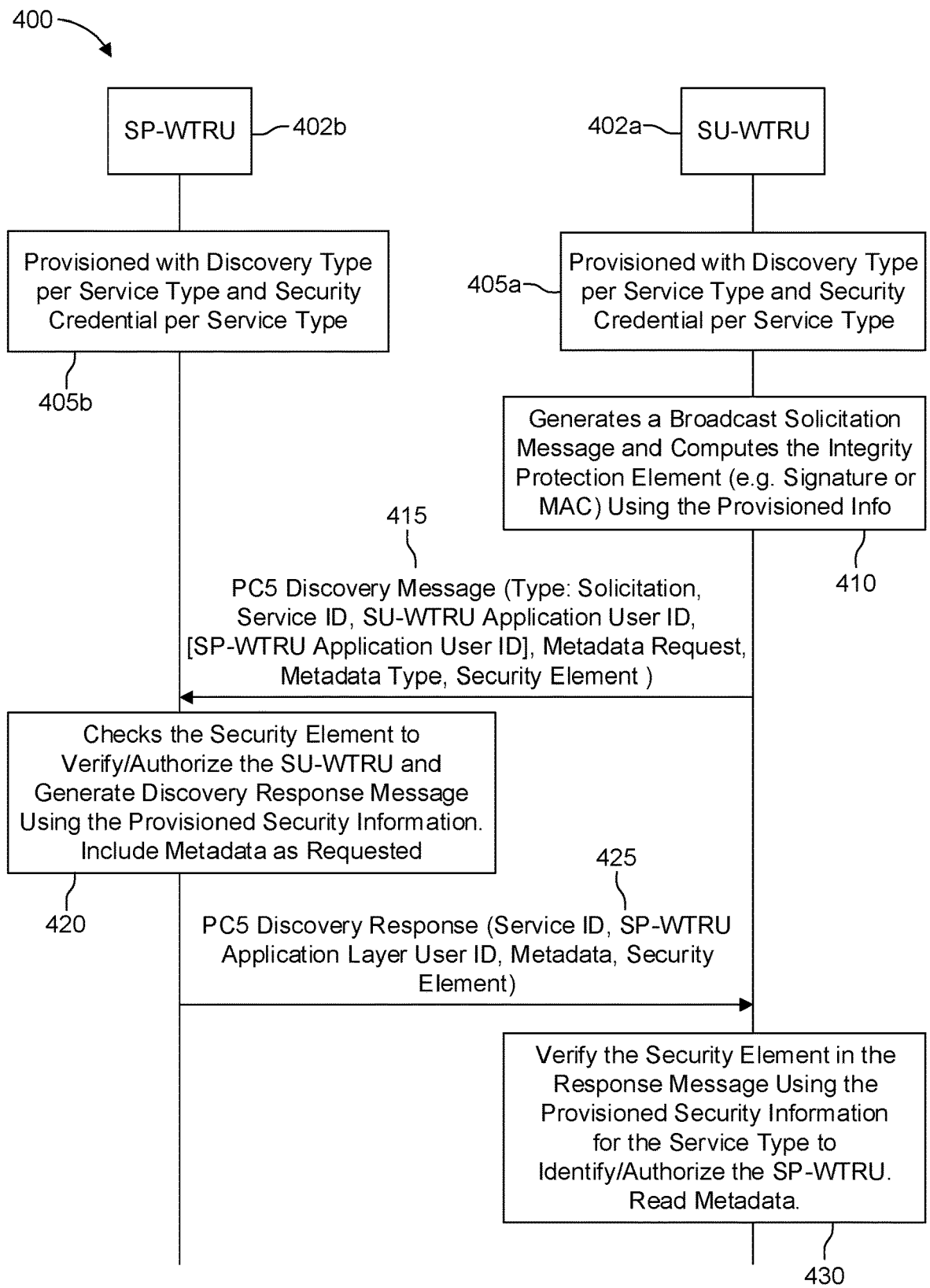
FIG. 4 is a diagram illustrating an example service oriented discovery procedure with metadata.

FIG. 4 illustrates an example service oriented discovery procedure 400 (with the discovery type of Model B) with metadata, which may be used in combination with any of other embodiments described herein. In this example, at steps 405a, 405b, the SP-WTRU 402b and SU-WTRU 402a may be provisioned with a discovery type per service type (or per service) and security credentials per service type (or per service).

The SU-WTRU 402a may want to discover an SP-WTRU 402b for a specific service type (or a specific service) and want to obtain metadata. At step 410, the SU-WTRU 402a may generate a broadcast discovery (or solicitation) request message that includes the Service ID, SU-WTRU's application user ID, and the security element (e.g., compute of integrity protection using the provisioned information). The SU-WTRU 402a may also include in the message the request type (e.g., solicitation), the SP-WTRU application user ID, a metadata request indication and a metadata type. The metadata request indication may be specified if metadata information is requested in the discovery response message. The metadata type may indicate what type of metadata is requested, such as summary/details or short/medium/large. For example: if the SP-WTRU 402b is a restaurant, the metadata may include the restaurant menu; if the metadata type is a summary, only a thin version of the menu is sent; and/or, if the metadata type is details, the full menu with prices is sent.

At step 415, the SU-WTRU 402a may broadcast the discovery request message.

At step 420, an SP-WTRU 402b receiving the discovery request message may check the security element. If the SP-WTRU 402b successfully authenticates the security element, the SP-WTRU 402b may verify if it supports the Service ID. If the SP-WTRU 402b supports the Service ID, the SP-WTRU 402b may look at the metadata indication and prepare the metadata to be returned according to the metadata type. The discovery response message may be prepared, including, but not limited to, the SP-WTRU application layer ID, L2 ID, and the metadata. The security element of the SP-WTRU 402b is computed based on the security credentials provisioned with the SP-WTRU 402b at step 405b, and the security element is added to the discovery response message.

At step 425, the SU-WTRU 402a may receive the discovery response message. At step 430, the SU-WTRU 402a may validate the security element and read the metadata.

As an example usage of the discovery procedure using metadata, the SU-WTRU 402a may request metadata with type set to "summary" and without specifying a target SP-WTRU application user ID. The SU-WTRU 402a may then expect to receive multiple discovery response messages, such as responses from different SP-WTRUs including the SP-WTRU 402b. Since a summary of metadata is returned in the discovery response messages, the user of the SU-WTRU 402a may have a quick look at the summary metadata and request detailed metadata from a specific SP-WTRU. This may be done by sending another discovery request message directly to the selected SP-WTRU (e.g., with destination set to the SP-WTRU's L2 ID), including the SP-WTRU application user ID and metadata type set to "details".

In one example, a WTRU may be provisioned with type of discovery (Model A or Model B) possibly on a per-service basis and one or more security credentials (e.g., signed certificate and root certificate or group key) on a per-service basis. Upon being triggered by the higher layers for a particular service, the WTRU may generate a broadcast solicitation discovery PC5 signaling message or PC5 discovery message including service ID, WTRU's application layer ID, and possibly target WTRU's application ID to discover a specific WTRU. The WTRU may then compute an integrity protection element (e.g., signature or MAC) using provisioned security credentials over the PC5 message. A PC5 message may then be sent along with the integrity protection element. The WTRU may receive one or more discovery response message(s) from one or more SP-WTRU(s) including the SP-WTRU ID and application layer and possibly target WTRU's application ID. The WTRU may check the integrity protection element of the response message based on the provisioned security credential (e.g., root certificate or group key) to verify the SP-WTRU identity/authorization. The WTRU may select an SP-WTRU and may decide to establish the unicast link with the SP-WTRU, or the WTRU may request one time metadata related to the service from the Service Provider WTRU.

Figure 5:
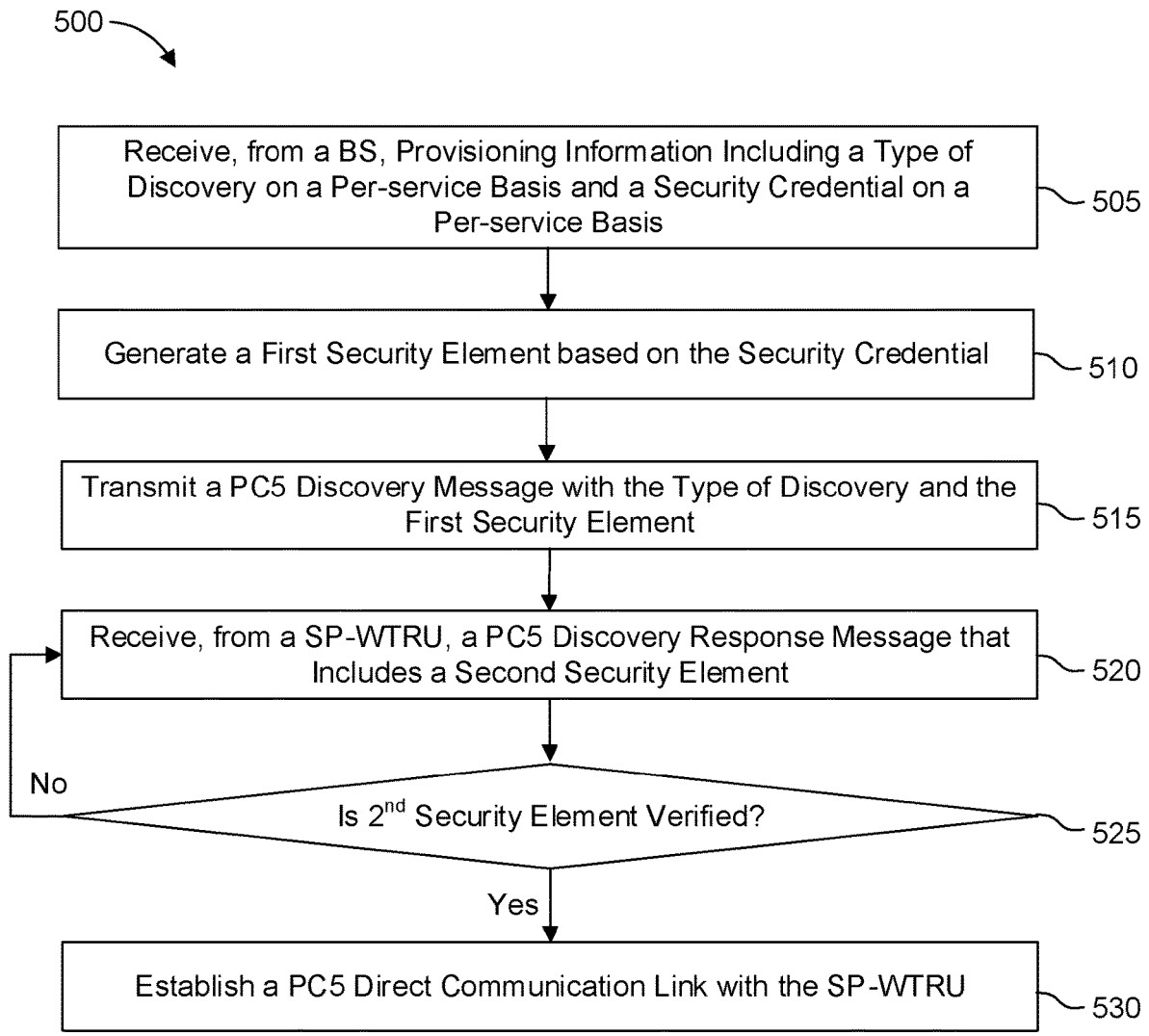
FIG. 5 is a diagram illustrating an example service-based discovery procedure.

FIG. 5 illustrates an example service-based discovery procedure 500, which may be used in combination with any of other embodiments described herein. At step 505, a WTRU (e.g., SU-WTRU) may receive, from a base station (BS), core network or application server provisioning information that includes a type of discovery on a per-service basis and a security credential on a per-service basis. The type of discovery may be Model A or Model B as described above. The type of discovery (e.g., Model A or Model B) may be (pre)determined or (pre)configured on a per-service basis. Different services (or service types) may have different types of discovery. For example, a restaurant service (or service type) may be associated with Model A and a taxi service (or service type) may be associated with Model B. The security credential may be a group key, a signed certificate, a root certificate, a symmetric private/public key pair, a shared secret or the like. The security credential may be (pre)determined on a per-service basis. Similar to the type of discovery, different services (or service types) may have different security credentials. For example, a restaurant service (or service type) may be associated with a group key and a taxi service (or service type) may be associated with a signed certificate. Alternatively or additionally, the WTRU may be provisioned with the type of discovery on a per-service basis and the security credential on a per-service basis in the WTRU. For example, the type of discovery on a per-service basis and/or the security credential on a per-service basis may be preinstalled or prestored in the SIM card or memory.

At step 510, the WTRU (e.g., SU-WTRU) may generate, based on the provisioned security credential, a first security element. The first security element may not be the same as the provisioned security credential. It may be the product generated using the security credential. For example, if the security credential is a group key, the generated security element may be a Message Authentication Code (MAC). If the security credential uses public key cryptography, the WTRU may include a certificate as part of the security element with a signature that the WTRU may provide for other WTRUs. If the security credential is a secret key, the generated security element may be a MAC and the receiving WTRU (e.g., SP-WTRU) may fetch a proper group key and verify whether the MAC is correct or not.

Assuming that the type of discovery is Model B (i.e. solicitation), at step 515, the WTRU may generate and broadcast a PC5 discovery message that includes the type of discovery and the first security element. The PC5 discovery message may further include, but are not limited to, the SU-WTRU identity, a service identity (that the WTRU is seeking for), an application identity, a metadata type and a metadata request.

At step 520, the WTRU (e.g., SU-WTRU) may receive, from another WTRU (e.g., SP-WTRU), a PC5 discovery response message that includes a second security element and a service identity associated with the service that the another WTRU (i.e. SP-WTRU) provides. The second security element may be generated based on the security credential that is provisioned with the SP-WTRU. The second security element may not be the same as the security credential provisioned with the SP-WTRU. It may be the product generated using the security credential provisioned with the SP-WTRU. For example, if the security credential provisioned with the SP-WTRU is a group key, the generated second security element may be a Message Authentication Code (MAC). If the security credential provisioned with the SP-WTRU uses public key cryptography, the SP-WTRU may include a certificate as part of the second security element with a signature that the SP-WTRU may provide for the SU-WTRU. If the security credential provisioned with the SP-WTRU is a secret key, the generated second security element may be a MAC and the receiving WTRU (e.g., SU-WTRU) may fetch a proper group key and verify whether the MAC is correct or not. Additionally, the PC5 discovery response message may include, but are not limited to, the SP-WTRU identity, an application identity and metadata associated with the service provided by the SP-WTRU. The PC5 discovery response message may be a broadcast message from the SP-WTRU.

At step 525, if the WTRU (e.g., SU-WTRU) verifies or authenticates the second security element based on the security credential provisioned with the SU-WTRU, at step 530, the SU-WTRU may initiate establishing a PC5 direct communication link with the SP-WTRU. In an embodiment, the SP-WTRU and the SU-WTRU may exchange metadata over the PC5 direct communication link. For example, a customer (i.e. SU-WTRU) who discovered a restaurant service provider (i.e. SP-WTRU) may only want to receive menu of the restaurant instead of fully communicating with the restaurant service provider (i.e. SP-WTRU). However, at step 525, if the WTRU fails to verify or authenticate the second security element, at step 520, the SU-WTRU may monitor for and receive another PC5 discovery response message from another SP-WTRU.

Although features and elements are described above in particular combinations of embodiments, one of ordinary skill in the art will appreciate that each feature or element can be used alone or in any combination with the other features and elements. Said another way, it is intended that features and elements from different embodiments may be combined. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media.

Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for use in a service utilizing-wireless transmit/receive unit (SU-WTRU), the method comprising:
   transmitting, by the SU-WTRU provisioned with a type of discovery on a per-service basis and a security credential on a per-service basis, a PC5 discovery message with the type of discovery, a metadata request, and a first security element generated by the SU-WTRU based on the provisioned security credential; and
   receiving, from a service providing-wireless transmit/receive unit (SP-WTRU), a PC5 discovery response message that includes a second security element, a service identity associated with a service that the SP-WTRU provides, an SP-WTRU application layer identification, an L2 identification, metadata associated with the service provided by the SP-WTRU, and an indication that the metadata is dynamic.

2. The method of claim 1, further comprising:
   on a condition that the second security element is verified based on the provisioned security credential, authorizing the SP-WTRU to establish a PC5 communication link.

3. The method of claim 1, further comprising:
   receiving, from a network server, provisioning information that includes the type of discovery and the security credential.

4. The method of claim 1, wherein the type of discovery on a per-service basis is solicitation.

5. The method of claim 1, wherein the security credential on a per-service basis comprises at least one of a certificate, a root certificate, a group key, a private key, or a public key.

6. The method of claim 1, wherein the first security element comprises at least one of a signature or a message authentication code (MAC).

7. The method of claim 1, wherein the second security element is generated based on a security credential provisioned with the SP-WTRU.

8. A service utilizing-wireless transmit/receive unit (SU-WTRU) provisioned with a type of discovery on a per-service basis and a security credential on a per-service basis, the SU-WTRU comprising:
   a receiver;
   a transmitter; and
   a processor,
   the transmitter and the processor configured to:
      transmit a PC5 discovery message with the type of discovery, a metadata request, and a first security element generated by the SU-WTRU based on the provisioned security credential; and
   the receiver and the processor configured to:
      receive, from a service providing-wireless transmit/receive unit (SP-WTRU), a PC5 discovery response message that includes a second security element, a service identity associated with a service that the SP-WTRU provides, an SP-WTRU application layer identification, an L2 identification, metadata associated with the service provided by the SP-WTRU, and an indication that the metadata is dynamic.

9. The SU-WTRU of claim 8, wherein the processor is further configured to, on a condition that the second security element is verified based on the provisioned security credential, authorize the SP-WTRU to establish a PC5 communication link.

10. The SU-WTRU of claim 8, wherein the receiver and the processor are configured to receive, from a network server, provisioning information that includes the type of discovery and the security credential.

11. The SU-WTRU of claim 8, wherein the type of discovery on a per-service basis is solicitation.

12. The SU-WTRU of claim 8, wherein the security credential on a per-service basis comprises at least one of a certificate, a root certificate, a group key, a private key, or a public key.

13. The SU-WTRU of claim 8, wherein the first security element comprises at least one of a signature or a message authentication code (MAC).

14. The SU-WTRU of claim 8, wherein the second security element is generated based on a security credential provisioned with the SP-WTRU.

* * * * *